3,014,806
PRODUCTION OF DEAD-BURNED MAGNESITE

Earl Leatham, Wexford, Pa., and Frank E. Lathe, Ottawa, Ontario, Canada, assignors to Northwest Magnesite Company, Pittsburgh, Pa., a corporation of Washington
No Drawing. Filed Mar. 22, 1956, Ser. No. 573,090
9 Claims. (Cl. 106—60)

Dead-burned magnesia (MgO), commonly called dead-burned magnesite, i.e., MgO largely or wholly in the form of periclase (crystalline MgO) and suitable for use as a refractory material, especially in metallurgical furnaces, is produced commonly by burning magnesite ($MgCO_3$) or magnesium hydroxide, ($Mg(OH)_2$) sometimes called magnesium hydrate, in rotary kilns. The aim is to convert the MgO to periclase in the form of grains of high density and low porosity.

Because of the high melting point of MgO, it is ordinarily not possible to form a dense and coarse grain at temperatures obtainable in rotary kilns unless there are some impurities present that form liquids at temperatures lower than the maximum temperature of the kiln. Accordingly, it is common practice in dead-burning high purity magnesite or magnesium hydroxide to add such mineralizers as iron oxide ($Fe_2O_3$) and silica, which promote the formation of dense magnesia grains during progress of the charge through the kiln. These agents are commonly added in finely divided form, and especially is this true of silica. However, despite such practices, the dead-burned magnesites produced heretofore have not been of as high bulk density and of as low porosity as desired, and especially is this true in the case of dead-burned magnesite made from the magnesium hydrate that is now produced in large quantities from sea water and calcined lime or dolomitic lime. Other brines containing magnesium compounds may be used similarly to produce $Mg(OH)_2$. Thus, in the case of silica as a mineralizer the common practice is to use it in the form known as flour, for example subdivided so that about 70 percent will pass a 200-mesh Tyler screen having openings of 0.0029 inch (0.074 mm.).

It is among the objects of this invention to provide a method of making dead-burned magnesite of high density and low porosity, which is simple, efficient, easily practiced and economical, and that provides a product of greater density and lower porosity as compared with the products made heretofore by the use of finely divided silica.

A further object is to provide such a method that is especially applicable to the dead-burning of magnesium hydroxide produced from magnesium-containing brines.

Other objects will be understood from the following specification.

We have discovered, and it is upon this that the invention is largely predicated, that the objects of the invention are attained by supplying a mineralizer additive, such as silica ($SiO_2$), in the form of coarse particles rather than as fine dust, or flour, as has been done heretofore.

Inasmuch as silica is the additive commonly used for these purposes, reference may be made to it in describing the invention in greater detail although it will be understood that other siliceous materials may be used, as will appear hereinafter.

We have found by actual experience on plant scale operation that silica supplied in the form of coarse particles, e.g. sand, is more effective than the previously used silica flour in that the dead-burned product is of greater bulk density and of lower porosity, and that pea size gravel in turn gives a denser and less porous grain than silica sand. For the purposes of the invention, it is essential that the silica be at least of such particle size that it is substantially wholly retained on a 10-mesh Tyler screen (opening 0.065 inch, or 1.65 mm.). We have found, furthermore, that silica material of at least ¼″ size produces grain of better bulk density and porosity characteristics, and trials indicate that even coarser silica pebble may be used, say at least ½″ size.

In the practice of the invention, the additive is supplied in the feed of $MgCO_3$, MgO or $Mg(OH)_2$ to the kiln in such proportion as to provide from about 1 to 10 percent of silica ($SiO_2$) by weight based on the MgO present. The mixture is burned to a maximum temperature of, say, 3000° to 3200° F. In this way we have been able to produce dead-burned magnesites of higher bulk density and of lower porosity than are to be had when the silica is used in the form of flour.

As exemplifying the benefits to be derived from the invention, reference may be made to plant scale runs using minus 325-mesh silica flour, minus 28-plus-65-mesh silica sand, and 4-mesh silica gravel, all specified with respect to Tyler standard screens. In these tests all operating conditions such as feed rate, kiln temperatures, and amount of added silica were maintained constant, only the size of the silica added being varied. The bulk specific gravities, referred to by the A.S.T.M. as bulk density, of the dead-burned magnesites produced were as follows, the value of 3.0 for the 325-mesh silica flour addition being characteristic of prior practices:

| Silica Added | Bulk Density |
| --- | --- |
| None | 2.97 |
| −325 mesh | 3.00 |
| −28 +65 mesh | 3.01 |
| 4 mesh | 3.10 |

These differences in bulk density are vital to the refractory brick manufacturer for the difference in bulk density due to this invention reduces by about 3 percent the porosity of brick made from the dead-burned magnesite, thereby effecting a marked improvement in quality.

Although our claim to invention rests upon the actual bulk densities of the magnesia grains obtained under various conditions in commercial rotary kilns, rather than any theoretical considerations, extensive laboratory experiments indicate that when fine magnesia or magnesium hydroxide is heated with (1) fine and (2) coarse silica, the reactions occur essentially as follows:

When fine magnesia and fine silica in such proportions as 95:5 are heated in a rotary kiln there is present a large excess of magnesia over that required to form forsterite ($2MgO.SiO_2$), and as the temperature of reaction is reached the formation of forsterite proceeds very rapidly. This occurs well before the hottest zone of the kiln has been reached. Quite possibly, traces of liquid eutectic are first formed, but this liquid is consumed, almost as soon as it is formed, by reaction with the excess of fine magnesia to form forsterite, and, since the melting point of forsterite is 3470° F. (1910° C.), a temperature never reached in the rotary kiln, no appreciable quantity of liquid exists during subsequent passage through the remainder and hottest part of the rotary kiln where such liquid is essential for coalescence of the magnesia.

When coarse silica in accordance with this invention is used, however, a very different set of conditions exists. The surfaces of the large particles of silica are attacked by the fine magnesia, and there is formed as liquid the eutectic between silica and clinoenstatite ($MgO.SiO_2$), having the composition 65 percent silica and 35 percent magnesia and melting at about 2817° F. (1547° C.). There now exists in each large particle of silica a reservoir of it that is continuously drawn upon to form more of the siliceous eutectic as the material completes its course through the rotary kiln. Thus, there is liquid available for the coalescing process which results in a high bulk density magnesite product. The liquid serves to bond the magnesia particles together and shrinks the resultant aggregates to a higher density. As before, the final product is periclase bonded with forsterite, but the course of the reactions is very different.

Credence is given to these theories by observations of the kiln, in which this development work was performed, when fine or coarse silica was added. The kiln is 400 feet long. When fine silica or silica flour is added to the kiln there is some tendency for a coating of kiln charge material to build up on the kiln wall at a point about 100 feet from the discharge end, where the temperature is below 2910° F. (1599° C.), but there is little tendency to coat the lining at the higher temperatures in the subsequent portion of the kiln. This suggests that sufficient liquid had formed by reaction of the mixture at the 100-foot location to stick some of the particles to the kiln lining but that this condition did not persist into the burning zone, as would be desirable. When coarse silica is added, the coating build-up is delayed to a point about sixty feet from the discharge end of the kiln and extends down the kiln to the discharge end with the maximum thickness at 17 feet from the discharge end of the kiln at the same place where the maximum temperature of the kiln (about 3150° F., 1732° C.) is located. Thus with coarse silica the major part of the reaction of silica and magnesia to form densifying liquids is made to persist in the kiln to essentially the maximum kiln temperature. An important factor in the effectiveness of this liquid is that it is more fluid when it is retained to these higher temperatures.

The belief in the past has been that mineralizer additives must be in the form of dust or flour to obtain intimate mixing and to avoid segregation and non-uniformity in the product. Microscopic examination of dead-burned magnesite grain produced with fine silica dust and with silica pebbles as coarse as ¼ inch has shown that there is no segregation of impurities in the latter case.

Although the invention has been described with particular reference to the use of silica, other highly siliceous additives may be used, such for example, as the magnesium silicates talc and serpentine, and even enstatite itself. Typical analyses of these additives are as follows:

|  | Talc, percent | Serpentine, percent | Enstatite, percent |
|---|---|---|---|
| $SiO_2$ | 54.5 | 39.6 | 57.0 |
| $Al_2O_3$ | 1.3 | 0.8 |  |
| Iron Oxide as FeO |  | 6.5 |  |
| $R_2O_3$ |  |  | 5.0 |
| CaO | 6.5 |  |  |
| MgO | 30.7 | 39.6 | 38.0 |
| Ign. Loss | 5.5 | 13.1 |  |

Other silicates may likewise be used, an example being fayalite ($2FeO.SiO_2$), which supplies both $SiO_2$ and the iron oxide desired for some purposes in producing dead-burned magnesite. Among the industrial slags which are suitable when applied in accordance with the invention are certain of the copper reverberatory slags and the acid converter slags produced in making steel, including, in particular, those slags containing at least 80 percent of iron oxide plus silica. It is believed that they are effective in the form of coarse grain additions for the same reasons as advanced above in connection with the use of coarse grain silica, i.e., the reactions with magnesia are delayed to the highest kiln temperatures where the liquids formed can have the most effect.

In addition to silica it will be understood from what has been said that the siliceous materials utilizable in the practice of the invention include magnesium and iron silicates less basic than the orthosilicates containing about 35 to 65 percent silica and predominantly in the coarse particle size described.

These siliceous materials are likewise used in the coarse forms described above and in amounts such as to supply from about 1 to 10 percent by weight of silica based upon the magnesia.

We now believe that as a result of the delayed reactions resulting from this invention there are the added advantages of reduced stack losses from the kiln and a lower proportion of fines in the product, both important features economically.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. That method of producing dead-burned grain magnesite comprising feeding to a kiln a mixture of a magnesian material of the class consisting of magnesium carbonate, magnesia and magnesium hydroxide together with at least one of the siliceous materials of the group consisting of silica and magnesium and iron silicates less basic than the orthosilicates and containing from about 35 to 65 percent of silica, said siliceous material being in the form of particles preponderantly at least 10-mesh size, and heating the mixture in said kiln to a temperature to dead-burn said magnesian material.

2. A method according to claim 1, said siliceous material being silica up to at least ½-inch size.

3. A method according to claim 1, said magnesian material being $Mg(OH)_2$.

4. A method according to claim 1, said siliceous material being selected from the group consisting of silica, talc, serpentine, enstatite, fayalite, and siliceous slags containing at least 80 percent of iron oxide plus silica.

5. That method of producing dead-burned grain magnesite comprising feeding to a kiln a mixture of a magnesian material of the class consisting of magnesium carbonate, magnesia and magnesium hydroxide together with at least one siliceous material of the group consisting of silica and magnesium and iron silicates less basic than the orthosilicates and containing from about 35 to 65 percent of silica, said siliceous material being in the form of particles preponderantly at least about 10-mesh size in an amount such as to supply from about 1 to 10 percent by weight of $SiO_2$ based on the MgO content of said material, and heating the mixture in said kiln to a temperature to dead-burn said magnesian material.

6. A method according to claim 5, said siliceous material being silica.

7. A method according to claim 6, said magnesian material being $Mg(OH)_2$.

8. A method according to claim 5, said siliceous material being of the group consisting of silica, talc, enstatite, serpentine, fayalite, and siliceous slags containing at least 80 percent of iron oxide plus silica.

9. A method according to claim 5, said magnesian material being $Mg(OH)_2$, and said siliceous compound being silica.

References Cited in the file of this patent

UNITED STATES PATENTS

| 2,206,131 | Seil | July 2, 1940 |
| 2,252,317 | Goldschmidt | Aug. 12, 1941 |
| 2,516,249 | Osborn | July 25, 1950 |
| 2,571,102 | Austin | Oct. 16, 1951 |
| 2,621,131 | Lathe | Dec. 9, 1952 |